(12) United States Patent
Masuyama et al.

(10) Patent No.: US 6,860,485 B2
(45) Date of Patent: Mar. 1, 2005

(54) PISTON RING

(75) Inventors: Tetsuo Masuyama, Saitama (JP);
Nobuyuki Matsushima, Saitama (JP)

(73) Assignee: Nippon Piston Ring Co., Ltd. (JP)

( * ) Notice: Subject to any disclaimer, the term of this patent is extended or adjusted under 35 U.S.C. 154(b) by 0 days.

(21) Appl. No.: 10/392,856

(22) Filed: Mar. 21, 2003

(65) Prior Publication Data

US 2003/0184023 A1 Oct. 2, 2003

(30) Foreign Application Priority Data

Apr. 2, 2002 (JP) ........................................ 2002-100175
Jun. 21, 2002 (JP) ........................................ 2002-181740

(51) Int. Cl.[7] .......................... B60T 11/236; F16J 9/00;
F02F 5/00
(52) U.S. Cl. ...................... 277/434; 277/435; 277/467; 277/471; 277/472
(58) Field of Search ............................... 277/434, 435, 277/436, 467, 471, 472

(56) References Cited

U.S. PATENT DOCUMENTS

| | | | | |
|---|---|---|---|---|
| 3,223,426 A | * | 12/1965 | Reid | 277/647 |
| 3,893,660 A | * | 7/1975 | Bush | 267/1.5 |
| 3,955,823 A | * | 5/1976 | Willem | 277/472 |
| 4,545,369 A | * | 10/1985 | Sato | 600/133 |
| 4,767,123 A | * | 8/1988 | Kiese | 277/488 |
| 5,265,890 A | * | 11/1993 | Balsells | 277/467 |
| 5,271,975 A | * | 12/1993 | Solano | 428/34.9 |
| 5,651,553 A | * | 7/1997 | Ishida et al. | 277/434 |
| 5,799,953 A | * | 9/1998 | Henderson | 277/554 |
| 6,019,025 A | * | 2/2000 | St. Amand | 89/1.817 |

FOREIGN PATENT DOCUMENTS

| | | | | |
|---|---|---|---|---|
| DE | 3821193 C | * | 9/1989 | ............. F16J/9/06 |
| DE | 19755425 A1 | * | 6/1999 | ............. F02F/5/00 |

* cited by examiner

Primary Examiner—Robert J. Sandy
Assistant Examiner—Vishal Patel
(74) Attorney, Agent, or Firm—Parkhurst & Wendel, L.L.P.

(57) ABSTRACT

The present invention provides a piston ring comprising a piston ring main body and an expander ring arranged on an inner peripheral surface thereof, the expander ring comprising two oil expander rings, one of which is housed in a space in a spiral of the other. The expander ring is formed so that the pressing force in the diameter expanding direction is larger in a high temperature state than in a low temperature state. The expander comprises two different kinds of expander members. One of these expander members has the same functions as those of a conventional expander, and the other is a member in which there occurs a change in tension in the diametral direction with temperature. As a result, the pressing force of the master expander member having the same effects as those of the conventional expander is made variable.

5 Claims, 4 Drawing Sheets

(a)

(b)

(a)

(b)

(a)

(b)

(c)

PISTON RING

BACKGROUND OF THE INVENTION

1. Field of the Invention

The present invention relates to a piston ring engaged with a piston ring groove of a piston of an internal combustion engine or the like.

2. Description of the Related Art

Piston rings are broadly classified into oil rings and pressure rings. In any case, a piston ring may comprise a piston ring main body, and an expander, arranged on the inner peripheral surface side of the piston ring main body, for imparting a pressing force in the diameter expanding direction of the piston ring main body.

In such a piston ring, the sum of the piston ring main body and the pressing force of the expander forms the tension of the piston ring as a whole. This tension of the piston ring as a whole is set so that the piston ring can display the functions thereof even under the severest conditions permitting use of the piston ring. For example, in a piston ring installed in a piston of an internal combustion engine, a piston ring tension is set on the assumption of a high speed-high load state of the internal combustion engine.

In a piston ring comprising a piston ring main body and an expander, therefore, a pressing force of the expander is of course set on the assumption of the high load condition of the internal combustion engine or the like.

In a conventional piston ring, however, engine oil adhering to the inner peripheral surface of the cylinder has an increasingly larger force causing the piston ring to float up under the effect of the oil hydraulic pressure generated between the cylinder inner peripheral surface and the piston ring along with the increase in the speed of reciprocation of the piston. The oil consumption tends to become larger according as the speed and the load become higher. Therefore, the tension of the entire piston ring is set on the assumption of a high speed and high load state, i.e., a high temperature state of the internal combustion engine. In a low speed and low load state, i.e., a low temperature state of the internal combustion engine, a tension higher than the necessary level would act on the inner peripheral surface of the cylinder, thus resulting in friction. In this case, it is also conceivable that a tension for the entire piston ring is set on the assumption of a low speed and low load state. In this state, however, the high speed and high load operation is not desirable because it causes a sudden increase in the coil consumption.

Apart from the above-mentioned problems, the following problem has been encountered.

In other words, when attaching a conventional piston ring comprising a piston ring main body and an expander to a piston, it was necessary to follow the procedure shown in FIG. 4. With reference to FIG. 4, a piston ring comprising a two piece combined oil ring 50 composed of an oil ring main body 51 and a coil expander 52 will be described.

(1) Disengaging a connecting section 54 of the coil expander 52 (see FIG. 4(a));
(2) Winding the coil expander 52 around an oil ring groove 55, and connecting the connecting section 54 with a connecting pin 56 (see FIG. 4(b)); and
(3) Attaching the oil ring main body 51 to the oil ring groove 55 so that an engaging port 511 is at a position at 180 relative to the position of the coil expander 52 (see FIG. 4(c)).

According to this attaching method, it is necessary to once disengage the connecting section of the coil expander and connect the connecting section again. This is troublesome, and in addition, this operation cannot be automated, resulting in the necessity to manually conduct all steps of operation.

The present invention was developed to solve these problems, and has a main object to provide a piston ring which generates tension suitable for the low speed and low load state and the high speed and high load state, respectively, and solve troublesome work of attaching a piston ring comprising a piston ring main body and an expander in a piston ring groove of a piston of an internal combustion engine or the like.

SUMMARY OF THE INVENTION

To solve the above-mentioned problem, the present invention provide a piston ring comprising a piston ring main body, and a coil expander arranged on the inner periphery of the piston ring main body; the coil expander comprising two coil expander members, and one of the coil expander members being housed in a space in a spiral of the other coil expander member.

The present invention further provides a piston ring comprising a piston ring main body, and an expander arranged on the inner periphery of the piston ring main body; the expander comprising a master expander member and a sub-expander member arranged by engaging with the master expander member; a piston ring being formed so that the pressing force in a diameter expanding direction to the piston ring of the expander as a whole imparted by the master expander member and the sub-expander member being larger in a high-temperature state than in a low temperature state.

The present invention further provides the piston ring described above, wherein at least one of the master expander member and the sub-expander member is formed by a shape memory alloy or a bimetal of which tension varies with temperature.

The present invention further provides the piston ring described above, wherein both the master expander member and the sub-expander member are coil expander members, and the arrangement thereof is such that one of the coil expander members is housed in a space in a spiral of the other coil expander member.

The present invention further provides the piston ring described above, wherein both the master expander member and the sub-expander member are plate expander members arranged on an axis.

Figure 1:
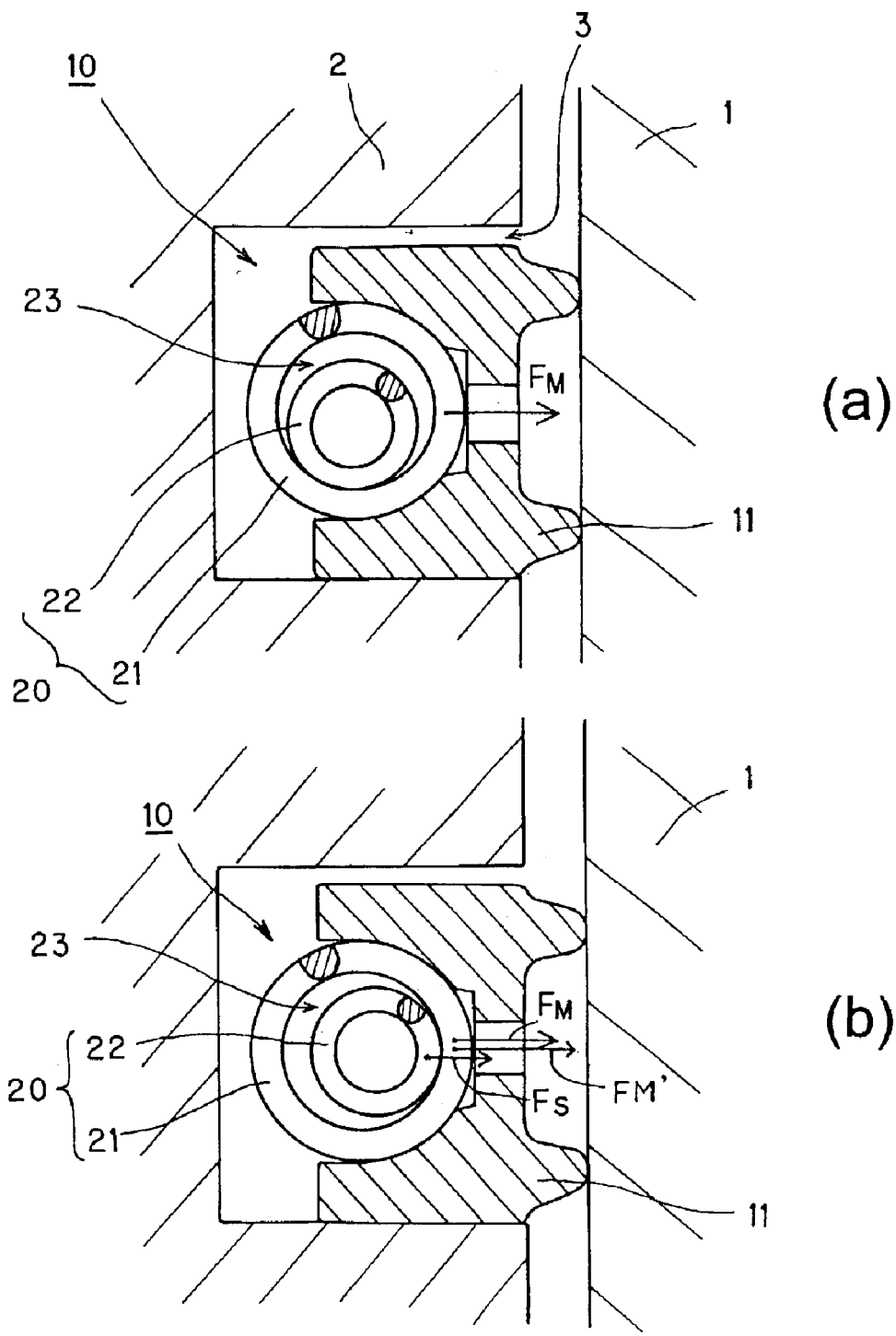
FIG. 1 covers longitudinal sectional views illustrating a first embodiment of the piston ring of the present invention: *a*) is a longitudinal sectional view of the piston ring of the invention in a low temperature state; and *b*) is a longitudinal sectional view of the piston ring of the invention in a high temperature state.

Reference numerals in the drawings represent the following component parts:

1: Cylinder; 2: Piston; 3: Oil ring groove; 10,30: Oil ring; 11, 31: Oil ring main body; 20, 40: Coil expander; 21, 41: Master expander member; 22, 42: Sub-expander member; 23: Space in spiral; 24: Engaging port of master expander member; 25: Engaging port of sub-expander member; FM: Pressing force of master expander member; FM': Pressing force of master expander member upon diametral deformation; FS: Pressing force of sub-expander member.

EMBODIMENTS

The present invention provides a piston ring comprising a piston ring main body, and a coil expander arranged on the inner periphery of the piston ring main body; and coil expander comprising two coil expander members, and one of the coil expander members being housed in a space in a spiral of the other coil expander member.

According to the present invention, the coil expander comprises two coil expander members, and one of the coil expander members is housed in the space in a spiral of the other expander member. The coil expander member housed in the space in the spiral serves as a connecting pin in a conventional coil expander. It is not therefore necessary to use a connecting pin, thus resulting in elimination of nuisance upon attaching the expander to a piston of an internal-combustion engine or the like, and in possibility to achieve automatic assembly.

Another embodiment of the present invention is a piston ring comprising a piston ring main body, and an expander arranged on the inner periphery of the piston ring main body; the expander comprising a master expander member and a sub-expander member arranged by engaging with the master expander member; a piston ring being formed so that the pressing force in a diameter expanding direction to the piston ring of the expander as a whole imparted by the master expander member and the sub-expander member being larger in a high temperature state than in a low temperature state.

According to the present invention, the expander comprises two members including a master expander member and a sub-expander member. The sub-expander member comprises a shape memory alloy or a bimetal in which phase transformation causes generation of tension on the high temperature side and losing of tension on the low temperature side with a set temperature as a boundary. The expander as a whole has a configuration in which the pressing force in the diameter expanding direction imparted by the master expander member and the sub-expander member to the piston ring main body is higher in the high temperature state than in the low temperature state. In the low temperature state of the internal combustion engine (i.e., a low speed and low load state of the internal combustion engine), the sub-expander member does not generate tension. Therefore, the tension for the expander as a whole imparted by the master expander member and the sub-expander member is the tension in the manufacturing stage of the piston ring of the present invention (hereinafter referred to as the "initial tension"). When the interior of the internal combustion is in a high temperature state (i.e., when the internal combustion engine is in a high speed and high load state), there occurs, in the sub-expander member, a change in shape to a shape memory state caused by phase transformation or a change in shape caused by properties of the bimetal. As a result, the tension of the expander as a whole imparted by the master expander member and the sub-expander member becomes higher than the above-mentioned initial tension.

More specifically, the expander of the present invention comprises two different kinds of expander members. A feature of the present invention lies in that an expander manufactured from a known conventional material commonly in use is used for one of the members (master expander member), and a member in which a change in tension is caused by a phase transformation due to a temperature change is used for the other member (sub-expander member) to cause a change in pressing force of the expander member. Under the effect of this feature, it is possible to impart the most suitable piston ring tension in response to the load condition of the internal combustion engine for the piston ring as a whole.

In other words, in the low temperature state, the piston ring of the present invention is in a state in which only the pressing force of the master expander member acts on the piston ring main body. Therefore, setting the pressing force of the master expander member to a value corresponding to a tension required for the piston ring as a whole in the low speed and low load state permits avoidance of the risk of applying a tension exceeding the required level in the low speed and low load state leading to serious friction, as in a conventional piston ring. In the high speed and high load state, the sub-expander member tends to become larger in the diametrical direction.

In addition to the pressing force of the master expander member, therefore, the sub-expander member also applies a pressing force to the piston ring main body in the diameter expanding direction. That is, the tension of the expander as a whole can be expressed as (pressing force of the master expander member)+(pressing force of the sub-expander member). The piston ring functions most suitable in the high speed and high load state can be ensured by setting a sum of these pressing forces in response to the tension that the entire piston ring is required to have in the high speed and high load state.

It is difficult to define the high speed and high load state (high temperature state) and the low speed and low load state (low temperature state) with concrete numerical values since there are various states, depending upon the design specifications and operating circumstances of the internal combustion engine. For example, general standards in the case of a gasoline engine for ordinary passenger car of 2,000 cc would be as follows: high temperature state: for example, from about 130 C to about 180 C; low temperature state: for example, from about −30 C to about 80 C; and medium temperature state: for example, from about 80 C to about 130 C.

As in the case mentioned above, it is difficult also to define the tension with concrete numerical values. General standards in the case of a gasoline engine for an ordinary passenger car of 2,000 cc would be as follows: initial tension: from about 0 to about 15 N; and tension in stretched state: from about 15 N to about 25 N.

In other terms, when expressing the tension necessary for the expander as a whole in the low speed and low load state as FLT; the tension necessary for the expander as a whole in the high speed and high load state as FMT; the pressing force imparted to the piston ring main body by the master expander member as FM; and the pressing force imparted to the piston ring main body by the sub-expander member as FS, the following equations are applied in the present invention:

$$FLT=FM$$

$$FHT=FM+FS$$

By setting pressing forces of the expander members so that the above equations are valid, respectively, a change in the expander tension can be caused by acting on the temperature.

In an embodiment of the piston ring of the present invention, both the master expander member and the sub-expander member may be coil expander members, and one of the coil expander members may be housed in a space in the spiral of the other coil expander member.

According to the present invention, it is possible to achieve the above-mentioned advantages of the invention, and further obtain the following merits.

Upon attaching the piston ring using coil expander members, it is necessary to first attach the coil expander members, and then attach the piston ring main body. A connecting pin has been indispensable for placing the coil expander in the piston ring groove of the piston during the period from attachment of the coil expander members until attachment of the piston ring main body. According to the present invention, the coil expander members are arranged in such manner that one coil expander member of the master expander member and the sub-expander member is housed in the space of the spiral of the other coil expander member. The coil expander member housed in the space of the spiral plays the role of the connecting pin in the conventional coil expander. It is not therefore necessary to use a connecting pin, and as a result, it is possible to avoid troublesome operation upon attaching the expander to the piston of an internal-combustion engine or the like.

In the piston ring of the present invention, both the above-mentioned master expander member and the sub-expander member may be plate expander members and may be arranged on an axis.

In this case also, as in the case of the coil expander member, the sub-expander member may be made of a shape memory alloy, or in this place, a bimetal of which the tension varies with temperature.

Since the tension of a bimetal is variable with temperature, a bimetal can suitably be used as a sub-expander member of the present invention, thus permitting display of the advantages of the invention.

In the piston ring of the present invention, the master expander member may be made of the shape memory alloy, or a bimetal of which the tension varies with temperature.

According to the present invention, the sub-expander member as well as the master expander member are made of a shape memory alloy or a bimetal of which the tension varies with temperature. It is therefore possible to cause a smooth change in the pressing force for the entire expansion in response to a change in temperature of the internal combustion engine.

For example, a case where both the master expander member and the sub-expander member are made of a shape memory alloy, and temperatures causing changes in shape are compared by selecting materials for the individual expander members so that the temperature is lower for the master expander member than for the sub-expander member will now be described.

When the interior of the internal combustion engine is in the low temperature state (i.e., when the internal combustion engine is in the low speed and low load state), the pressing force for the entire expander depends only upon the initial tension of the master expander member, and therefore, has a small value. When the internal combustion engine is in the medium temperature state (at a temperature between the low temperature state and the high temperature state, at which a shape change is caused in the master expander member), a shape change into the shape memory state is caused by a phase transformation in the master expander member which has come to have a longer peripheral length. While the pressing force of the entire expander is still dependent only on the master expander member, the pressing force produced by the tendency of the peripheral length of the master expander member becoming longer is added to the initial tension of the master expander member. As a result, the value becomes larger as compared with the pressing force in the low temperature state. When the interior of the internal combustion engine transfers to the high temperature state (to a temperature at which a shape change is caused in sub-expander member), as described above, there occurs a change in shape of the sub-expander member, causing the peripheral length of the sub-expander member to become longer, and this presses the master expander member from inside. At this point in time, the pressing force of the expander as a whole becomes equal to the sum of the pressing force of the master expander member and the pressing force of the sub-expander member after the shape change. The value of this total pressing force is larger than the pressing force in the medium temperature state.

As described above, the stress for the entire expander member can be changed in three stages by making both the master expander member and the sub-expander member from a shape memory alloy or a bimetal.

The shape, the size (thickness, diameter, etc.) and the material of the coil expander and the plate expander in the present invention are naturally the shape and size upon arrangement on the inner peripheral surface of the piston ring, and should satisfy desired tension requirements. In other words, it suffices to select a material which can display a desired tension in the high temperature and low temperature states from among known shape memory alloys and bimetals, and appropriately design and manufacture, by a commonly used method, expanders having shapes and sizes adaptable to the inner peripheral surface of the piston ring used in combination, and there is no particular limitation imposed in this respect.

The piston ring of the present invention will now be described in detail with reference to the drawings.

[First Embodiment]

FIG. 1 illustrates a first embodiment of the piston ring of the present invention, or more particularly, is a schematic sectional view of an oil ring 10 using a coil expander 20 attached to an oil ring groove 3 provided in a cylinder 1. FIG. 1(a) illustrates the oil ring 10 in a low speed-low load state, i.e., in a low temperature state; and FIG. 1(b) illustrates the coil ring 10 in a high speed and high load state, i.e., in a high temperature state.

As shown in FIG. 1, the oil ring 10 of the present invention comprises an oil ring main body 11 and coil expander members 20, and the coil expander members 20 comprise a master expander member 21 and a sub-expander member 22 made of a shape memory alloy.

In the low temperature state, as shown in FIG. 1(a), from among the master expander member 21 and the sub-expander member 22 composing the coil expander members 20, only the master expander member 21 imparts a pressing force FM to the oil ring main body 11. Therefore, a problem of generation of an excessive friction never occurs by setting a pressing force FM of the master expander member 21 in response to the tension (FLT) which the entire piston ring is required to have in the low temperature state (i.e., FLT=FM).

In the high temperature state, as shown in FIG. 1(b), the sub-expander member 22 made of a shape memory alloy is deformed, and as a result, the sub-expander member 22 presses the master expander member 21 from the inner surface side in the diameter expanding direction under the effect of tension resulting from the increasing tendency of the peripheral length. Therefore, the pressing force imparted to the piston ring main body 11 by the expander members 20 the synthesized force (FM+FS) of the pressing force FM of the master expander member and that FS of the sub-expander member. By setting this synthesized force at a pressing force in response to the tension (FMT) that the entire piston ring is required to have in the high speed and high load state (i.e., FMT=FM+FS), the piston ring floats up under the pressure of an oil film present between the cylinder inner peripheral surface and the sliding surface of the piston ring outer periphery in the high speed and high load state, thus making it possible to prevent a sudden increase in the oil consumption.

In the piston ring 10 of the present invention shown in FIG. 1, the sub-expander member 22 is housed in the space 23 in the spiral of the master expander member 21. The present invention is not however limited to this configuration, but the master expander member 21 may be housed in the space 23 in the spiral of the sub-expander member 22.

Not only the sub-expander member 22, but also the master expander member 21 may be made of a shape memory alloy. In this case, both the master expander member 21 and the sub-expander member 22 are made of the shape memory alloy. Any of the members is therefore deformed in the diameter-expanding direction, depending upon temperature. It is desirable to set a temperature causing deformation of one of the members (for example, the master expander member 21) at a lower temperature than that for the other (for example, the sub-expander member 22).

As a result, in the low temperature state, the process is the same as in the above-mentioned case of FIG. 1(b) (the pressing force is FM). When the temperature reaches the level of medium temperature state (a temperature between the low temperature state and the high temperature state, at which the master expander member is deformed), the master expander member 21 is deformed in a direction increasing the peripheral length, and a pressing force FM' larger than the initial tension is produced. In the high temperature state, deformation is in a direction causing the peripheral length of the sub-expander member 22 to become longer, and the pressing force for the entire expander becomes FM'+FS.

As a result, when only the sub-expander member is made of a shape memory alloy, the pressing force of the expander as a whole is any one of the two kinds including FM and MF+FS. By making the master expander member also of a shape memory alloy, in contrast, the pressing force of the entire expander is any one of the three kinds including FM, FM' and FM+FS, this permitting smooth coping with a change in temperature.

Figure 2:
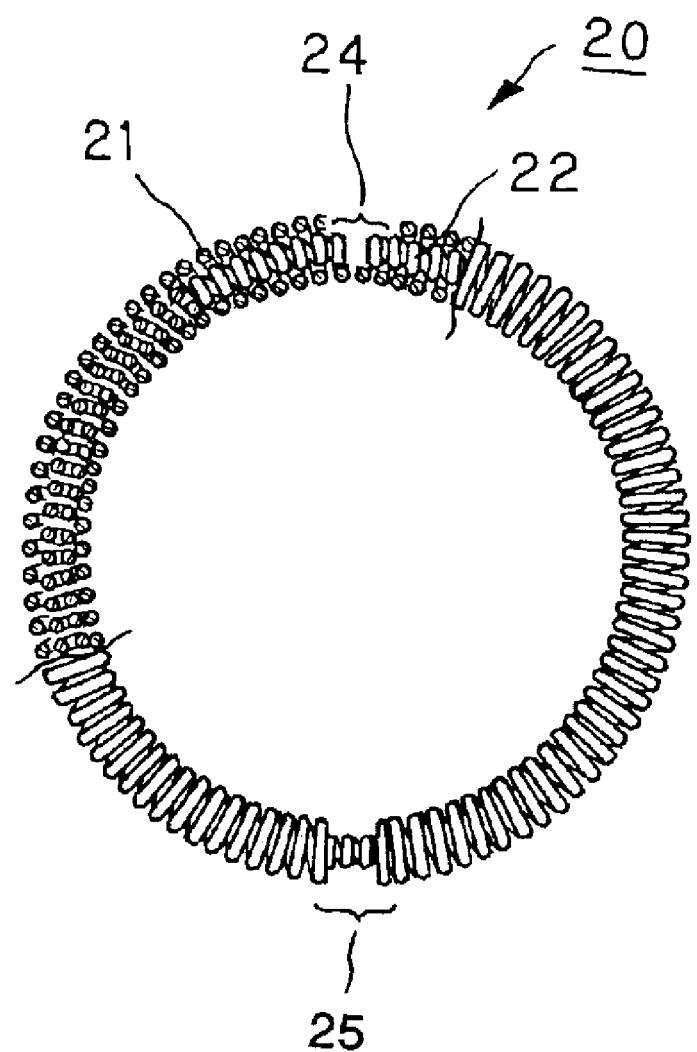
FIG. 2 is a plan view of a coil expander of the piston ring of the present invention.

In the expander member 20 of the piston ring 10 of the present invention shown in FIG. 1, as shown in FIG. 2, by shifting the position of the abutment 24 of the master expander member 21 by 180 from the abutment 25 of the sub-expander member 22, it is possible to treat the assembly as if it were single expandable ring. This eliminates the necessity of a connecting pin used conventionally, solves troublesome operation upon attachment, and makes it possible to automatically assemble the piston ring.

For the expander member 20 shown in FIG. 2, if resolution of only the problems upon attachment, it is not always necessary to make both the master expander member 21 and the sub-expander member 22 from a shape memory alloy, but may be manufactured from conventional materials.

[Second Embodiment]

Figure 3:
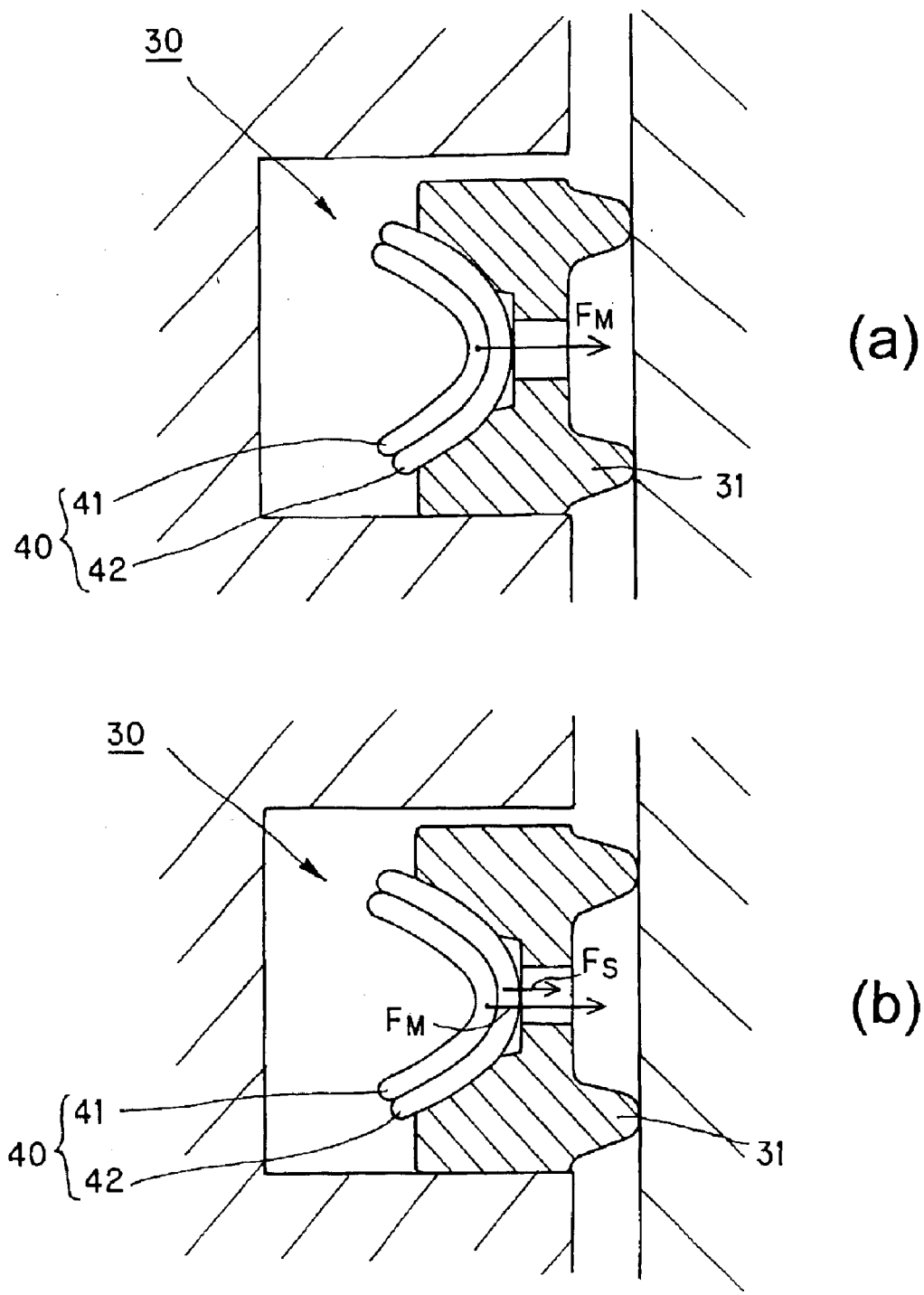
FIG. 3 covers longitudinal sectional views illustrating a second embodiment of the piston ring of the present invention: (*a*) is a longitudinal sectional view of the piston ring of the invention in a low temperature state; and (*b*) is a longitudinal sectional view of the piston ring of the invention in a high temperature state.
Figure 4:
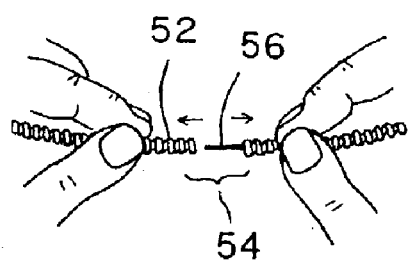
FIG. 4 covers descriptive views illustrating the attaching procedure of a conventional two-piece combined oil ring to a piston: (a) is a partial perspective view illustrating a disengaging state of the coil expander; (b) is a partial perspective view of the state in which the coil expander is wound around the coil ring groove and a connecting pin is connected; and (c) is a partial perspective view illustrating a 180 turned position of (b) in a state in which the oil ring main body is attached.
Figure 4:
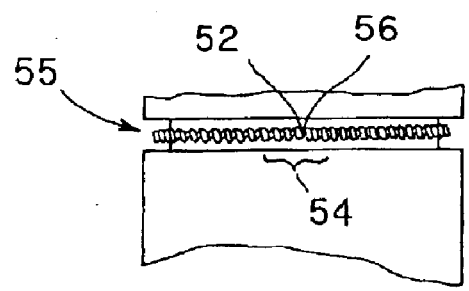
Figure 4:
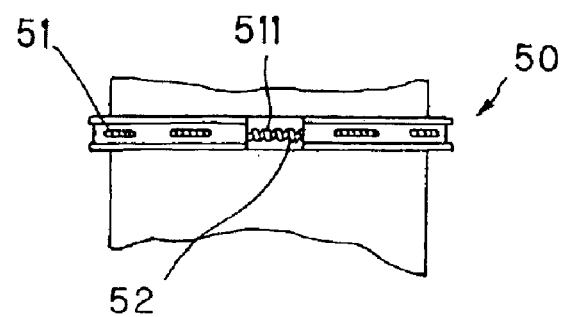

FIG. 3 illustrates a second embodiment of the piston ring of the present invention, and is a schematic sectional view of an oil ring using plate expander members as expander members: FIG. 3(a) shows an oil ring 30 in the low load state, i.e., the low temperature state; and FIG. 3(b) shows the oil ring 30 in the high load state, i.e., in the high temperature state.

As shown in FIG. 3, the oil ring 30 of the present invention comprises an oil ring main body 31 and plate expander members 40. The plate expander members 40 comprise a master expander member 41 and a sub-expander member 42 made of a shape memory alloy. In the piston ring of the present invention, as described above, the expander members are not limited to coil expander members, but as shown in FIG. 3, the same advantages as in the piston ring shown in FIG. 1 are available by using two plate expander members in superposition and using one of the plate expander members as a master expander member 51 and the other as a sub-expander member 52 made of a shape memory alloy.

Even in this case, as in the above-mentioned first embodiment, it is possible to make the master expander member 51 also from a shape memory alloy, thus achieving the same effects as in the first embodiment.

The individual component parts composing the piston ring of the present invention will now be described.

The piston ring of the present invention is not limited to the oil rings described in the above-mentioned first embodiment and second embodiment, but any piston ring using expanders may be employed, and apart from the oil ring, a pressure ring is also adaptable.

The expander in the piston ring of the present invention comprises a master expander member and a sub-expander member in engagement therewith.

The master expander member composing the expander of the present invention is not particularly limited, but a conventionally known expander member is applicable. A coil expander member or a plate expander member is applicable. For the pressing force thereof, however, it is necessary to establish the following relationship with the sub-expander member, as described above. It may be made of any of the materials (a shape memory alloy and a bimetal) for the sub-expander member.

As the sub-expander member arranged in engagement with the above-mentioned master expander member, on the other hand, it is necessary to use a member exhibiting a larger change in the diametral direction caused by a change in temperature than the master expander member, i.e., a material having an increased peripheral length in the high temperature state than in the low temperature state.

As such a material, a shape memory alloy is preferable. More specifically, an Ni—Ti alloy or an Ni—Ti—Cu alloy is applicable. In this case, when it is desired to set a large change in the diametral direction between the low temperature state and the high temperature state, it is recommendable to use an Ni—Ti—Cu alloy and to set a transformation temperature within a range from 70 to 100 C, depending upon circumstances of the internal combustion engine.

A sub-expander member formed into a coil shape or a wave form may be used so that the connecting surface of the bimetal made by superposing two materials having different thermal expansion coefficients agrees with the radial direction of the piston ring.

[Advantages]

According to the piston ring of the present invention, as described above, by composing the expander of two different kinds of expander members, it is possible to cause one of the expander members (master expander member) is to serve to exert the same effect as a conventional expander, and cause the other (sub-expander member) to have a function of changing the pressing force of the master expander member playing the same role as a conventional expander by using the other member as a member causing a change in a diametral direction with temperature. As a result, it is possible to impart the most suitable oil ring tension in response to the load condition of the internal combustion engine for the oil ring as a whole.

By making the expander from two kinds of coil expander members, one of the coil expander members can play the role of a conventional connecting pin. As a result, the connecting pin used conventionally becomes unnecessary, and it is possible to eliminate the troublesome operation upon attaching, and automatically assemble the same to the piston ring groove.

What is claimed is:

1. A piston ring assembly for installation in a piston ring groove of a piston of an internal combustion engine, the piston ring assembly comprising:

a piston ring main body; and an expander located on the inner periphery of the piston ring main body, said expander comprising:

a master expander member for imparting a pressing force in an increasing diameter direction to the piston ring main body so that the piston ring slides along an inner surface of a piston ring groove; and a sub-expander member engaged with the master expander member and comprising a shape memory alloy that generates a first force in an increasing diameter direction at a first temperature and a second force in an increasing diameter direction at a second temperature, the first force and temperature being lower than the second force and temperature.

2. The piston ring assembly according to claim 1, wherein both the master expander member and the sub-expander member comprise coil expander members, wherein one of the coil expander members is located inside a spiral structure of the other coil expander member.

3. The piston ring assembly according to claim 1, wherein both the master expander member and the sub-expander member each comprise a plate-shaped structure and are concentrically located to be striker.

4. The piston ring assembly according to claim 2, wherein said temperature is in the range of −30° C. to 80° C. and said second temperature is in the range of 130° C. to 180° C.

5. The piston ring assembly according to claim 2, wherein said first force is in the range of 0 N to 15 N and said second force is first force 15 N to 25 N.

* * * * *